United States Patent
Katou et al.

(10) Patent No.: US 8,132,405 B2
(45) Date of Patent: Mar. 13, 2012

(54) EXHAUST EMISSION PURIFYING APPARATUS FOR ENGINE

(75) Inventors: Toshikazu Katou, Ageo (JP); Hideki Matsunaga, Ageo (JP); Toshiki Sawaki, Higashimatsuyama (JP)

(73) Assignees: Nissan Diesel Motor Co., Ltd., Ageo-Shi, Saitama (JP); Bosch Corporation, Tokyo (JP)

(*) Notice: Subject to any disclaimer, the term of this patent is extended or adjusted under 35 U.S.C. 154(b) by 756 days.

(21) Appl. No.: 12/177,852

(22) Filed: Jul. 22, 2008

(65) Prior Publication Data

US 2008/0282681 A1 Nov. 20, 2008

Related U.S. Application Data

(63) Continuation of application No. PCT/JP2007/061704, filed on Jun. 11, 2007.

(30) Foreign Application Priority Data

Jun. 26, 2006 (JP) .................. 2006-174859

(51) Int. Cl.
*F01N 3/10* (2006.01)
(52) U.S. Cl. ........................... 60/301; 60/295
(58) Field of Classification Search .............. 60/286, 60/295, 301, 303
See application file for complete search history.

(56) References Cited

U.S. PATENT DOCUMENTS

| | | | | |
|---|---|---|---|---|
| 2003/0200022 A1* | 10/2003 | Streichsbier et al. | ......... | 701/108 |
| 2005/0217253 A1* | 10/2005 | Onodera et al. | ................ | 60/295 |
| 2007/0163232 A1* | 7/2007 | Ueno | .............. | 60/274 |

FOREIGN PATENT DOCUMENTS

| | | |
|---|---|---|
| EP | 1149991 A2 | 10/2001 |
| EP | 1176292 A1 | 1/2002 |
| EP | 1672191 A1 | 6/2006 |
| JP | 2000-027627 | 1/2000 |
| JP | 2003-269145 | 9/2003 |
| JP | 2005-248924 | 9/2005 |

(Continued)

OTHER PUBLICATIONS

U.S. Appl. No. 10/574,346, filed Nov. 28, 2006, Engine Exhaust Emission Control Device and Exhaust Emission Control Method.

(Continued)

*Primary Examiner* — Thomas Denion
*Assistant Examiner* — Patrick Maines
(74) *Attorney, Agent, or Firm* — McDermott Will & Emery LLP

(57) ABSTRACT

An exhaust emission purifying apparatus for an engine, which is provided with: an electric pump sucking and supplying a liquid reducing agent by pumping out of a reducing agent tank; a flow control valve controlling flow rate of the liquid reducing agent; and an injection nozzle injection-supplying the liquid reducing agent with the controlled flow rate, to an exhaust emission upstream of NOx reduction catalytic converter. At the engine starting, a highly pressurized air is urged to reversely flow to a reducing agent supply system upstream of the flow control valve. Then it is determined whether or not the reducing agent supply system brings about clogging based on a pressure change produced by the reverse flow. When a number of frequency at which it is consecutively determined as occurrence of clogging reaches a predetermined number or more, it is determined that the clogging is serious, which is unable to be readily mended.

4 Claims, 3 Drawing Sheets

FOREIGN PATENT DOCUMENTS

| | | |
|---|---|---|
| JP | 2006-077765 | 3/2006 |
| JP | 2007-138719 | 6/2007 |
| JP | 2007138719 A * | 6/2007 |
| WO | WO 2005033482 A1 * | 4/2005 |
| WO | WO 2006/049044 A1 | 5/2006 |

OTHER PUBLICATIONS

U.S. Appl. No. 10/577,222, filed Nov. 28, 2006, Exhaust Gas Purifying Apparatus and Exhaust Gas Purifying Method of an Engine.

U.S. Appl. No. 11/790,739, filed Apr. 27, 2007, Exhaust Emission Purifying Apparatus for Engine.

U.S. Appl. No. 11/800,450, filed May 4, 2007, Exhaust Gas Purification Apparatus.

U.S. Appl. No. 11/812,871, filed Jun. 22, 2007, Exhaust Emission Purifying Apparatus for Engine.

U.S. Appl. No. 11/952,397, filed Dec. 7, 2007, Exhaust Gas Purifying Apparatus for Engine.

U.S. Appl. No. 12/173,783, filed Jul. 15, 2008, Exhaust Emission Purifying Apparatus for Engine.

U.S. Appl. No. 12/173,791, filed Jul. 15, 2008, Atmospheric Temperature Detecting Apparatus and Exhaust Emission Purification Apparatus.

* cited by examiner

EXHAUST EMISSION PURIFYING APPARATUS FOR ENGINE

This application is a continuation of PCT/JP2007/061704, filed on Jun. 11, 2007.

BACKGROUND OF THE INVENTION

1. Field of the Invention

The present invention generally relates to an exhaust emission purifying apparatus for an engine (hereinbelow, referred to as "exhaust emission purifying apparatus") which is provided for reductively purifying nitrogen oxides (NOx) contained in an exhaust emission, and more particularly relates to a technology for determining with a high accuracy whether or not a supply system for a liquid reducing agent or a precursor thereof brings about serious clogging.

2. Description of the Related Art

As a catalytic purification system which purifies NOx contained in the exhaust emission emitted from an engine, there has been proposed an exhaust emission purifying apparatus, in Japanese Laid-open (Kokai) Patent Application Publication No. 2000-27627. In this exhaust emission purifying apparatus, the liquid reducing agent or precursor thereof (to be referred to as "liquid reducing agent") according to an engine operating condition is injection-supplied to the exhaust emission at a position upstream side of a NOx reduction catalytic converter disposed in an engine exhaust system, so that NOx contained in the exhaust emission and the reducing agent are subjected to the catalytic-reduction reaction by which NOx is purified into harmless components.

Further, in this exhaust emission purifying apparatus, if the supply system of the liquid reducing agent (to be referred to as "reducing agent supply system") is clogged due to the deposition of a reducing agent component, the mixing-in of foreign substances, or the like, the reducing agent of appropriate amount is not supplied to the NOx reduction catalytic converter, so that required NOx purification performance cannot be achieved. Therefore, the applicant of the present application has proposed in the Japanese Patent Application No. 2005-329441 a technology for determining whether or not the reducing agent supply system brings about clogging based on a change in pressure produced by a reverse flow of a highly pressurized air to the reducing agent supply system. In this proposed technology, in order to urge the highly pressurized air to flow, in the reverse flow manner, to the reducing agent supply system, there is a need to temporally lower a pressure in the reducing agent supply system. However, it is impossible to supply the reducing agent to the NOx reduction catalytic converter in a state where the pressure in the reducing agent supply system is lowered. Consequently, from the standpoint of prevention of deterioration of the property of the exhaust emission, the determination whether or not the reducing agent supply system brings about clogging can be performed only once when the engine starts an operation thereof.

The clogging of the reducing agent supply system can be almost divided into "the deposition of the reducing agent component" and "the mixing-in of the foreign substances". When the clogging is caused by the mixing-in of the foreign substances, it can not be mended unless the foreign substances are removed. On the other hand, when the clogging is just a minor clogging caused by the deposition of the reducing agent component, there is a possibility that the clogging will be mended by circulating the liquid reducing agent in the reducing agent supply system, and thereby dissolving therein the deposited reducing agent component. However, in the conventionally proposed technology, the determination indicating that the clogging is brought about is made only by one processing executed when the engine starts the operation thereof, and therefore, even if the clogging is a minor one which is caused by the deposition of the reducing agent component and can be mended thereafter, it is determined that the clogging is brought about in the reducing agent supply system.

SUMMARY OF THE INVENTION

Therefore, in view of the problems encountered by the above-described conventional technology, the present invention has an object to provide an exhaust emission purifying apparatus which determines that a clogging is unable to be readily mended, when it is determined that a reducing agent supply system has consecutively brought about clogging a predetermined number of frequency, to thereby be allowed to highly accurately determine whether or not the reducing agent supply system is seriously clogged.

In order to achieve the above-mentioned object, an exhaust emission purifying apparatus comprises: a reduction catalytic converter which is disposed in an engine exhaust system and reductively purifies nitrogen oxides contained in an exhaust emission; a reducing agent tank which is provided for storing therein a liquid reducing agent; a pump which carries out suction and supply of the liquid reducing agent by pumping out of the reducing agent tank; a flow control valve which controls a flow rate of the liquid reducing agent supplied due to pumping by the pump; an injection nozzle which injection-supplies the liquid reducing agent having flown from the flow control valve by which flow rate of the liquid reducing agent is controlled, to the exhaust emission at a position upstream of the reduction catalytic converter; and a control unit incorporating therein a computer, wherein the reducing agent tank, the pump, the flow control valve and the injection nozzle substantially form a reducing agent supply system, and wherein the control unit implements: to open the flow control valve while maintaining stopping of the pump, when the engine starts an operation thereof, thereby urging a highly pressurized air to reversely flow from a downstream side of the flow control valve to the reducing agent supply system which is disposed on an upstream side of the flow control valve; to first determine whether or not the reducing agent supply system brings about clogging, based on a pressure change in a region on a downstream side of the pump and on the upstream side of the flow control valve; to count a number of frequency at which a first determination indicating that the clogging is brought about in the reducing agent supply system is consecutively made; and to further determine that the reducing agent supply system brings about serious clogging which is unable to be readily mended when the counted frequency reaches a predetermined number or more. At this time, by implementing to first determine that the reducing agent supply system brings about clogging when the pressure change in the region on the downstream side of the pump and on the upstream side of the flow control valve is less than a predetermined value of pressure, the determination of whether or not the clogging is brought about can be made by a simple process. Further, in order to suppress battery drain, it is preferable to store, in a nonvolatile memory, the number of frequency at which the first determination is consecutively made indicating that the reducing agent supply system brings about clogging.

According to the present invention, when the engine starts the operation thereof, the highly pressurized air is urged to reversely flow from the downstream side of the flow control valve to the reducing agent supply system disposed on the upstream side of the flow control valve, and the first determination of whether or not the reducing agent supply system brings about clogging is made based on the pressure change produced by the reverse flow. Then, when the number of frequency at which the first determination indicating that the reducing agent supply system brings about clogging is consecutively made reaches the predetermined number or more, it is further determined that the reducing agent supply system brings about serious clogging which is unable to be readily mended. That is, the clogging of the reducing agent supply system can be almost divided into "the deposition of the reducing agent component" and "the mixing-in of the foreign substances", and in a case where the clogging is caused by the deposition of the reducing agent component, there is a possibility that the clogging will be mended by circulating the liquid reducing agent in the reducing agent supply system, thereby dissolving therein the deposited reducing agent component. Therefore, by means of the further determination indicating that the reducing agent supply system brings about serious clogging at the time when the first determination of clogging is consecutively made for a predetermined number of frequency, instead of the single clogging determination, it is possible to surely take the time for mending the minor clogging and improve the accuracy of the determination.

DESCRIPTION OF THE PREFERRED EMBODIMENTS

Details of the present invention will be described hereunder, referring to the accompanying drawings.

Figure 1:
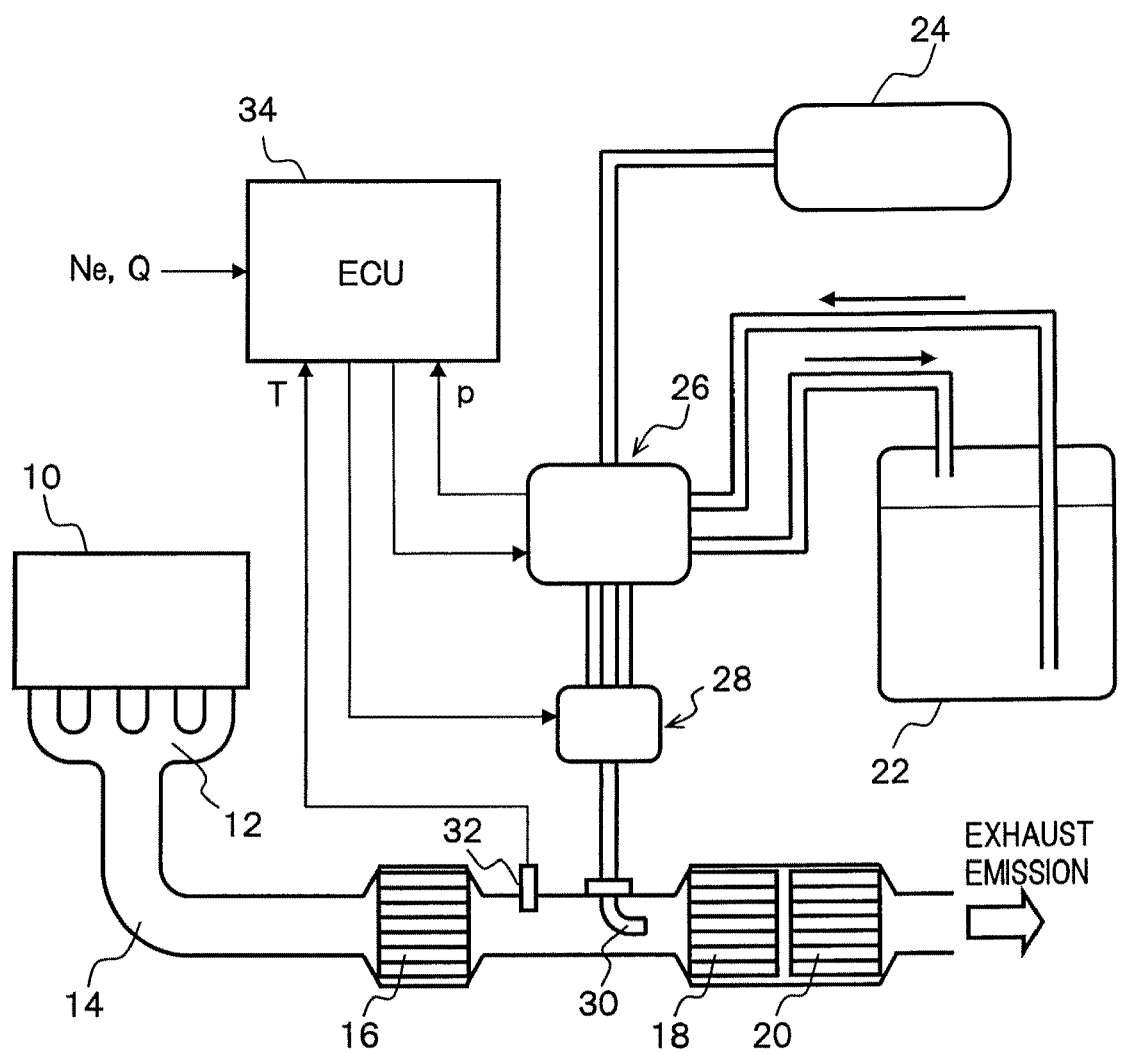
FIG. 1 is an entire block diagram of an exhaust emission purifying apparatus embodying the present invention.

FIG. 1 shows an entire configuration of an exhaust emission purifying apparatus which uses a urea aqueous solution, which is a precursor of a liquid reducing agent, for purifying NOx contained in an engine emission by the catalytic-reduction reaction.

In an exhaust pipe 14 connected to an exhaust manifold 12 of an engine 10, there are disposed, along an exhaust emission flow direction, a nitrogen oxidation catalytic converter 16 which oxidizes nitrogen monoxide (NO) into nitrogen dioxide ($NO_2$), a NOx reduction catalytic converter 18 which reductively purifies NOx using ammonia as a reducing agent, and an ammonia oxidation catalytic converter 20 which oxidizes ammonia passed through the NOx reduction catalytic converter 18, in this order.

Figure 2:
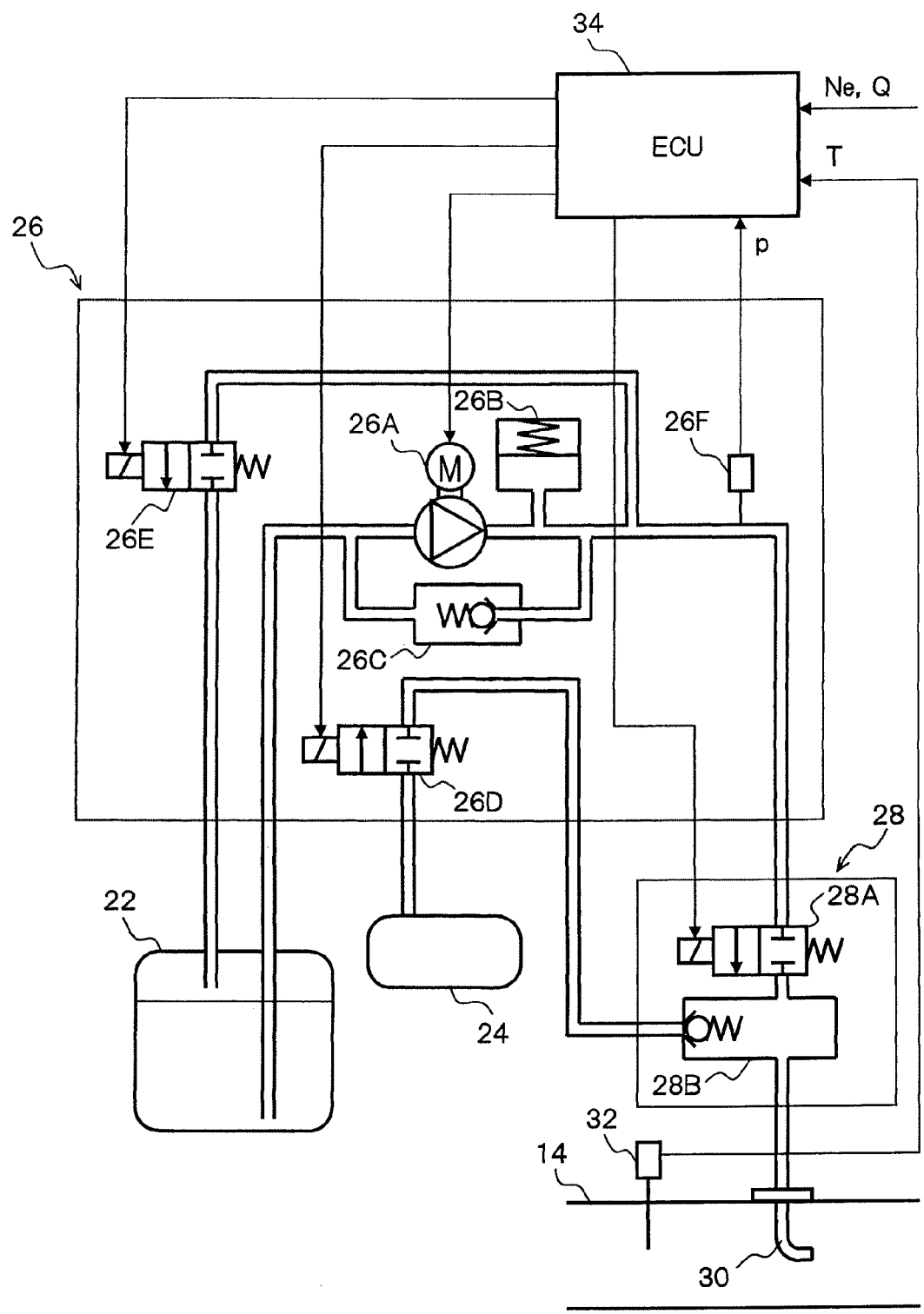
FIG. 2 is a block diagram illustrating a reducing agent supply system in detail.

In a reducing agent supply system which supplies the reducing agent to the NOx reduction catalytic converter 18, there are disposed: a reducing agent tank 22 which is provided for storing therein the urea aqueous solution; a pump module 26 which carries out suction of the urea aqueous solution from a bottom of the reducing agent tank 22 and supply of the urea aqueous solution by pumping it out, and controls a pressure of highly pressurized air supplied from an air reservoir 24; a dosing module 28 which controls a flow rate of the urea aqueous solution supplied from the pump module 26 by pumping, and mixes the urea aqueous solution with the pressure-controlled highly pressurized air to be in an atomized state; and an injection nozzle 30 which injection-supplies the urea aqueous solution in the atomized state to the exhaust emission at a position upstream of the NOx reduction catalytic converter 18. As shown in FIG. 2, the pump module 26 incorporates therein at least: an electric pump 26A which carries out suction of and supply of the urea aqueous solution by pumping; a damper 26B which is capable of suppressing a change in pressure; a relief valve 26C which is arranged to send back an excess urea aqueous solution to a region on an inlet side of the electric pump 26A; a pressure control valve 26D which controls the pressure of the highly pressurized air supplied from the air reservoir 24; a vent valve 26E which is arranged so that the reducing agent supply system disposed on the downstream side of the electric pump 26A and on the upstream side of the dosing module 28 is fluidly communicated with the reducing agent tank 22; and a pressure sensor 26F which detects a pressure p inside the reducing agent supply system disposed on the downstream side of the electric pump 26A. On the other hand, as shown in the same figure, the dosing module 28 incorporates therein at least: a flow control valve 28A which controls a flow rate of the urea aqueous solution supplied by pumping of the electric pump 26A of the pump module 26; and a mixing chamber 28E which allows the urea aqueous solution with the controlled flow rate to be mixed with the highly pressurized air, a flow rate of which is controlled by the pressure control valve 26D of the pump module 26, to be in the atomized state.

On the exhaust pipe 14, in a portion between the nitrogen oxidation catalytic converter 16 and the injection nozzle 30, there is mounted an exhaust temperature sensor 32 which detects an exhaust temperature T.

As a control system of the exhaust emission purifying apparatus, a reducing agent dosing control unit (hereinbelow referred to as "reducing agent dosing ECU") 34 incorporating therein a computer respectively receives output signals from the pressure sensor 26F incorporated in the pump module 26 and the exhaust temperature sensor 32, and an engine rotating speed Ne and an engine load Q which are read via a CAN (controller area network) and the like. Then, the reducing agent dosing ECU 34 electronically controls the electric pump 26A, the pressure control valve 26D and the flow control valve 28A, respectively, based on the exhaust temperature T, the engine rotating speed Ne and the engine load Q by a control program stored in a ROM (read only memory) of the reducing agent dosing ECU 34, to thereby injection-supply the urea aqueous solution by the injection nozzle 30 according to the engine operating condition. Further, the reducing agent dosing ECU 34 executes a determination process determining, by the control program, whether or not the reducing agent supply system brings about serious clogging which is unable to be readily mended.

In such an exhaust emission purifying apparatus, the urea aqueous solution injection-supplied by the injection nozzle 30 is hydrolyzed with the exhaust heat and the water vapor in the exhaust emission to be converted into ammonia performing as a reducing agent. It is known that converted ammonia reductively reacts with NOx contained in the exhaust emission in the NOx reduction catalytic converter 18 and is converted into water ($H_2O$) and nitrogen ($N_2$). At this time, in order to improve the NOx purification efficiency in the NOx reduction catalytic converter 18, NO is oxidized into $NO_2$ by the nitrogen oxidation catalytic converter 16, so that a rate between NO in the exhaust emission and $NO_2$ therein is improved to be suitable for the catalytic-reduction reaction. On the other hand, ammonia passed through the NOx reduction catalytic converter 18 is oxidized by the ammonia oxidation catalytic converter 20 disposed on the downstream side of the NOx reduction catalytic converter 18 in the exhaust passageway, and therefore, it is possible to prevent ammonia from being discharged into the atmosphere just as it is.

Figure 3:
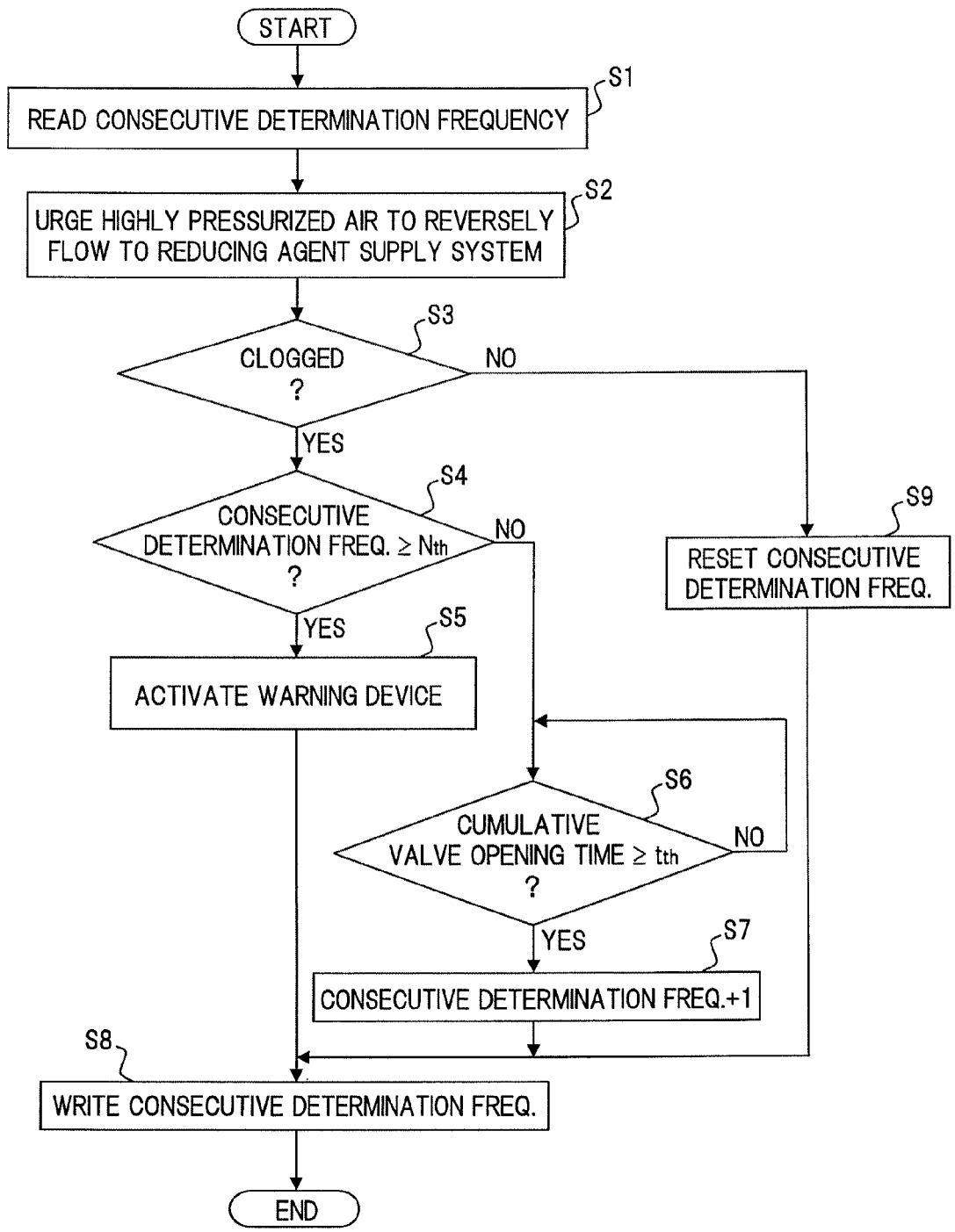
FIG. 3 is a flowchart showing a process of determining whether or not the reducing agent supply system brings about clogging.

FIG. 3 shows the clogging determination process which is executed in the reducing agent dosing ECU 34 upon starting of the engine 10. In the exhaust emission purifying apparatus, concurrently with the clogging determination process, a reducing agent dosing process in which the urea aqueous solution is injection-supplied by the injection nozzle 30 according to the engine operating condition is performed.

In step 1 (to be abbreviated as "S1" in the figure, and the same rule will be applied to the subsequent steps), from a nonvolatile memory, such as an EEPROM (electrically erasable programmable read only memory) and the like, which constitutes the reducing agent dosing ECU 34, a number of frequency at which the determination is consecutively made indicating that the reducing agent supply system brings about clogging (hereinbelow referred to as "consecutive determination frequency") is read. Here, the consecutive determination frequency has been properly written on the nonvolatile memory in a below-mentioned process.

In step 2, in order to determine whether or not the reducing agent supply system brings about clogging, the highly pressurized air is urged to flow, in a reverse flow manner, to the reducing agent supply system. Specifically, while the flow control valve 28A is opened with the electric pump 26A stopped, the pressure control valve 26D is opened, so that the highly pressurized air stored in the air reservoir 24 is urged to reversely flow from the mixing chamber 28B to the reducing agent supply system disposed on the upstream side of the mixing chamber 28B.

In step 3, by monitoring the pressure p detected by the pressure sensor 26F, it is first determined whether or not the reducing agent supply system disposed on the upstream side of the flow control valve 28A brings about clogging, based on a pressure change $\Delta p$ produced by the reverse flow of the highly pressurized air. Specifically, when the reducing agent supply system does not bring about clogging, the highly pressurized air passing through the flow control valve 28A reaches the pressure sensor 26F because the electric pump 26A is stopped. At this time, the pressure p in the region on the downstream side of the electric pump 26A and on the upstream side of the flow control valve 28A rapidly increases when the highly pressurized air is urged to reversely flow, so that if the pressure change $\Delta p$ reaches a predetermined value or more, the determination indicating that the reducing agent supply system does not bring about clogging can be made. Then, when the reducing agent supply system brings about clogging (Yes), the routine proceeds to step 4. In contrast, when the reducing agent supply system does not bring about clogging (No), the routine proceeds to step 9, and then, in order to start over again the counting of the consecutive determination frequency, the consecutive determination frequency at that time is reset.

In step 4, when the reducing agent supply system brings about clogging, it is further determined whether or not the consecutive determination frequency counted by then reaches a predetermined number $N_{th}$ or more. Then, when the consecutive determination frequency reaches the predetermined number $N_{th}$ or more (Yes), the routine proceeds to step 5, and a warning device, such as a warning light, a buzzer or the like, is activated, to thereby indicate that the reducing agent supply system brings about serious clogging which is unable to be readily mended. On the other hand, when the consecutive determination frequency is less than the predetermined number $N_{th}$ (No), the routine proceeds to step 6.

In step 6, it is determined whether or not a cumulative valve opening time of the flow control valve 28A reaches a predetermined time $t_{th}$ or more, after a first determination is made indicating that the reducing agent supply system brings about clogging. Thus the reason for using cumulative valve opening time is that the present embodiment employs a configuration in which the urea aqueous solution is intermittently injection-supplied, taking into consideration that there is a condition where the purification of the exhaust emission is not necessary because the NOx concentration in the exhaust emission is low according to the engine condition. Then, when the cumulative valve opening time reaches the predetermined time $t_{th}$ or more (Yes), the routine proceeds to step 7, and then the consecutive determination frequency is incremented by 1. In contrast, when the cumulative valve opening time is shorter than the predetermined time $t_{th}$ (No), the routine is put on standby. When the engine 10 is stopped before the cumulative valve opening time reaches the predetermined time $t_{th}$, the clogging determination process is ended at the time.

In step 8, the consecutive determination frequency is written on the nonvolatile memory.

According to such an exhaust emission purifying apparatus, the highly pressurized air is urged to flow, in a reverse flow manner, to the reducing agent supply system which is disposed on the upstream side of the flow control valve 28A, so that it is able to be determined whether or not the reducing agent supply system brings about clogging based on the pressure change $\Delta p$ in the reducing agent supply system. Then, when it is first determined that the reducing agent supply system brings about clogging and the consecutive determination frequency counted by then reaches the predetermined number $N_{th}$ or more, it is further determined that the reducing agent supply system brings about serious clogging which is unable to be readily mended, and then the warning device is activated to indicate that the reducing agent supply system is seriously clogged.

The clogging of the reducing agent supply system c an be almost divided into the deposition of the reducing agent component and the mixing-in of the foreign substances. Concerning the clogging cause by the deposition of the reducing agent component, there is a possibility that the clogging will be mended by circulating the urea aqueous solution in the reducing agent supply system and thereby dissolving therein the deposited reducing agent component. Thus, if the warning device is configured to indicate that the clogging is brought about in the reducing agent supply system every time when such a minor clogging occurs, unnecessary cleaning and the like might be carried out. Consequently, by making the determination that the reducing agent supply system brings about serious clogging, when the clogging determination is consecutively made for the predetermined number $N_{th}$, instead of the single clogging determination, it is possible to surely take the time for mending the minor clogging and improve the accuracy of the determination.

Here, in order to surely take the time for mending the minor clogging brought about in the reducing agent supply system, the consecutive determination frequency is counted up when the cumulative valve opening time (cumulative injection time of the urea aqueous solution) reaches the predetermined time $t_{th}$ or more after the determination indicating that the clogging is brought about is made.

Further, when the warning device indicates that the reducing agent supply system brings about serious clogging, it is possible to fulfill the function of the exhaust emission purifying apparatus by performing an appropriate procedure, such as a disassembly-cleaning, and the like, to the pump module 26 and the dosing module 28.

Incidentally, the liquid reducing agent is not limited to the urea aqueous solution. It is possible to use the ammonia aqueous solution, or alcohol or diesel oil, which contain hydrocarbon as a main component thereof, or the like, taking the characteristics of the NOx reduction catalytic converter 18 into consideration.

It should be appreciated that the entire contents of Japanese Patent Application No. 2006-174859, filed on Jun. 26, 2006, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

We claim:

1. An exhaust emission purifying apparatus for an engine, comprising:
   a reduction catalytic converter which is disposed in an engine exhaust system and reductively purifies nitrogen oxides contained in an exhaust emission;
   a reducing agent tank which is provided for storing therein a liquid reducing agent;
   a pump which carries out suction and supply of the liquid reducing agent by pumping out of the reducing agent tank;
   a flow control valve which controls a flow rate of the liquid reducing agent supplied due to pumping by the pump;
   an injection nozzle which injection-supplies the liquid reducing agent having flowed from the flow control valve by which the flow rate of the liquid reducing agent is controlled, to the exhaust emission at a position upstream of the reduction catalytic converter; and
   a control unit incorporating therein a computer,
   wherein the reducing agent tank, the pump, the flow control valve and the injection nozzle substantially form a reducing agent supply system, and
   wherein the control unit implements:
   to open the flow control valve while maintaining stopping of the pump, when the engine starts an operation thereof, thereby urging a highly pressurized air to reversely flow from a downstream side of the flow control valve to the reducing agent supply system which is disposed on an upstream side of the flow control valve,
   to determine whether or not the reducing agent supply system brings about clogging, based on a pressure change in a region on a downstream side of the pump and on the upstream side of the flow control valve;
   to calculate a frequency at which the determination is consecutively made that the clogging is brought about in the reducing agent supply system; and
   to determine that the reducing agent supply system brings about serious clogging which is unable to be readily mended when the counted frequency reaches a predetermined number or more,
   wherein the control unit implements to calculate the frequency, when a cumulative valve opening time of the flow control valve reaches a predetermined time or more after the determination is made indicating that the reducing agent supply system brings about clogging.

2. An exhaust emission purifying apparatus for an engine according to claim 1, wherein the control unit implements to determine that the reducing agent supply system brings about clogging, when the pressure change in the region on the downstream side of the pump and on the upstream side of the flow control valve is less than a predetermined value of pressure.

3. An exhaust emission purifying apparatus for an engine according to claim 1, wherein the control unit implements to activate a warning device which is able to indicate that the reducing agent supply system brings about serious clogging, when the determination is made that the reducing agent supply system brings about serious clogging.

4. An exhaust emission purifying apparatus for an engine according to claim 1, wherein a nonvolatile memory is further provided for storing the frequency at which the determination is consecutively made indicating that the reducing agent supply system brings about clogging.

* * * * *